No. 711,066. Patented Oct. 14, 1902.
C. C. McCURLEY.
DAMPER FOR STOVEPIPES OR DRUMS.
(Application filed Dec. 9, 1901.)
(No Model.)
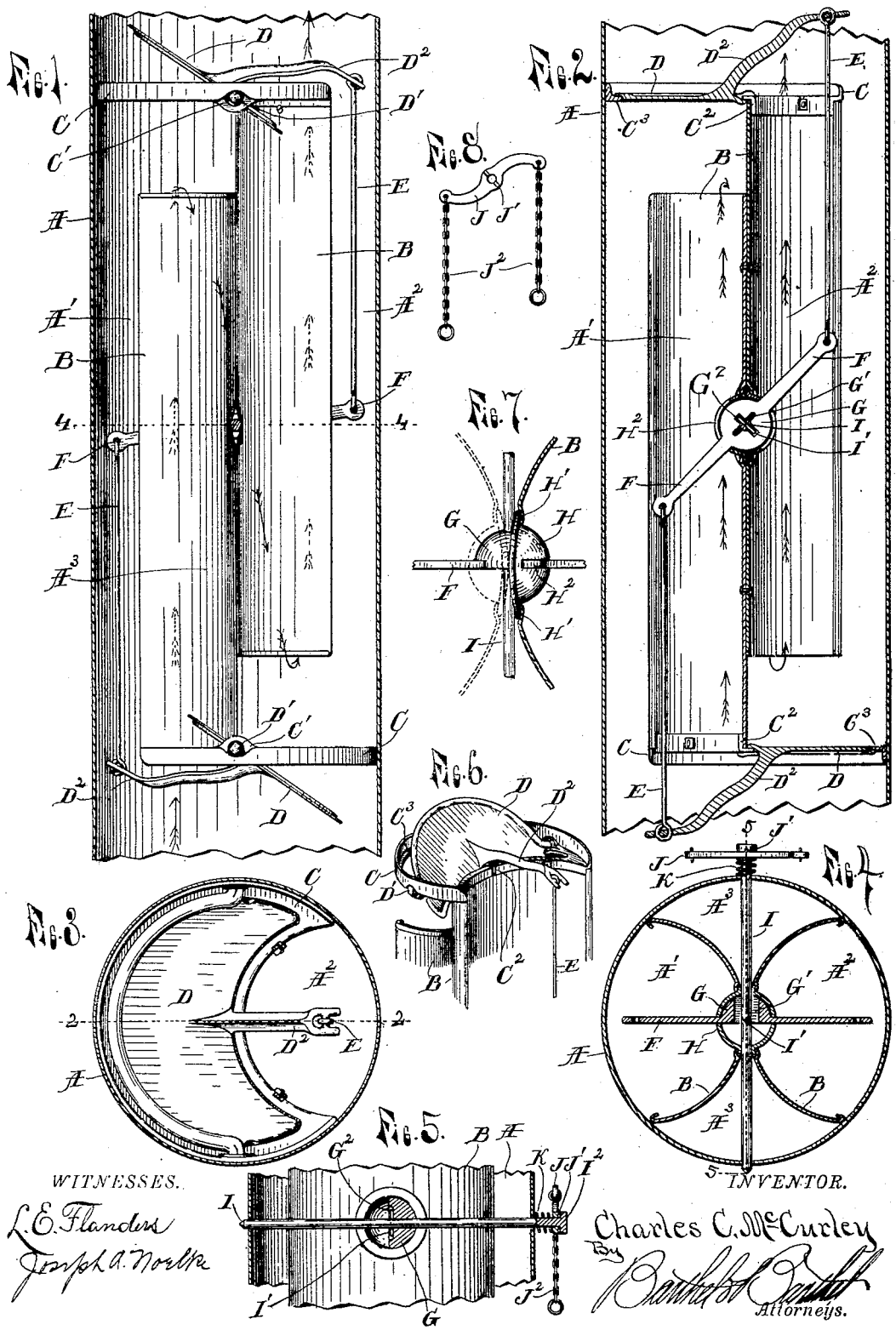

UNITED STATES PATENT OFFICE.

CHARLES C. McCURLEY, OF DETROIT, MICHIGAN, ASSIGNOR OF TWO-FIFTHS TO GEORGE O. HILTON, OF DETROIT, MICHIGAN.

DAMPER FOR STOVEPIPES OR DRUMS.

SPECIFICATION forming part of Letters Patent No. 711,066, dated October 14, 1902.

Application filed December 9, 1901. Serial No. 85,218. (No model.)

*To all whom it may concern:*

Be it known that I, CHARLES C. MCCURLEY, a citizen of the United States of America, residing at Detroit, in the county of Wayne and State of Michigan, have invented certain new and useful Improvements in Dampers for Stovepipes or Drums, of which the following is a specification, reference being had therein to the accompanying drawings.

My invention relates to improvements in dampers for stovepipes and drums; and its object is to provide a cheap and simple device which is easily applied to the ordinary stovepipe and divides the space therein into flues, all having an extended radiating surface for heating purposes and so proportioned that the uptake-flues have approximately the same capacity as the downdraft, the device also being provided with a plurality of valves for controlling the flow of air, so that when the same are closed the heated air is forced to follow a tortuous path to retard its flow and cause the same to give off its heat and when open allows the free and unrestricted passage of the air and products of combustion therethrough, the valves being also so arranged and constructed that the weight of one balances that of the other, thus making them easy to operate and obviating the necessity of providing means for holding said valves when turned to any intermediate position; and a further object of my invention is to provide the same with certain details of construction, all as more fully hereinafter described, and particularly pointed out in the claims, reference being had to the accompanying drawings, in which—

Figure 1 is a longitudinal section of a length of stovepipe containing a device embodying my invention shown in elevation. Fig. 2 is the same, showing the damper in section on the line 2 2 of Fig. 3. Fig. 3 is a plan view of the end of the damper. Fig. 4 is a section of the same on the line 4 4 of Fig. 1; Fig. 5, a section on the line 5 5 of Fig. 4, showing the operating-rod and ball and socket. Fig. 6 is a perspective view of one end of the damper. Fig. 7 is an enlarged detail showing the ball and socket of the rocker-bar, and Fig. 8 is a detail of the S-handle.

A is a section of ordinary pipe or other suitable tubular structure, and B B are two semicircular partition-walls secured together by rivets, with their convex sides in contact and dividing the space within the pipe A into four flues, two uptakes $A'$ and $A^2$ and two downdrafts $A^3$, each of the flues $A'$ and $A^2$ being of about the same capacity as the two flues $A^3$, and said walls are of the same length, but secured together so that one projects beyond the other to provide a means of communication between the flues, as will hereinafter more fully appear. To the projecting end of each of these walls is secured a crescent-shaped ring C, of cast metal, having its depressed or concaved side formed to conform to the curvature of said wall B and secured thereto by bolts and its circular or convex portion of a form and size to fit closely within the pipe A. These rings C are each provided with bearings $C'$ and an inwardly-projecting flange $C^3$, and crescentic valve-plates D, shaped to close the openings of said rings C and engage the flanges, are provided with trunnions $D'$ to engage said bearings, the said rings C being divided at $C^2$, so that they may be sprung to allow the trunnions to enter into the bearings. The valves D are each provided with an upwardly and laterally extended operating-arm $D^2$, to each of which arms is pivotally connected a connecting-rod E, the opposite ends of said rods being attached to the opposite ends of a rocker-bar F. Said rocker-bar is pivoted at its middle by being provided with a hemispherical protuberance G at one side, which engages a socket formed of two halves or cup-shaped castings H, openings being cut in the walls B to receive said socket, which is held therein by providing said castings H with flanges $H'$ to engage the adjacent sides of said walls, which walls are riveted together and hold the halves of the socket in contact. The said flanges $H'$ are curved to conform to the curvature of the walls B, as shown in Fig. 7, and thus diverge at the sides of the socket, leaving a space between the flanges, through which space an operating-rod I extends, an axial opening being provided therefor in the protuberance G. Slots $H^2$ are provided in the socket H, through which the rocker-bar F extends, these slots being closed by the hemispherical portion of the bar to prevent the passage of air through the socket. The operating-rod I is provided intermediate its ends with a transverse pin I', and through the protuberance G is cut a slot G', as shown in Fig. 4, through which the pin is passed, the rod I then being turned to engage said pin with grooves $G^2$, extending at right angles to the width of said slot. Openings in the pipe A form end bearings for said rod I, and on one end of said rod, which extends a distance outside the stove-pipe, is a head $I^2$, which head is notched to receive a rib J' on the S-shaped operating-handle J, which is provided with the pulls $J^2$. Sleeved on the rod I between the pipe A and the handle J is the spring K, which exerts a force to hold the rib J' engaged with its notch and also to hold the pin I' in the groove $G^2$. When the valves D are opened, the air and products of combustion pass directly upward through the flues; but when said valves are closed the upper one closes the upper end of the flue A' and the flues $A^3$ and the lower valve closes the lower end of the flues $A^3$ and the flue $A^2$, thus forcing the air, &c., to pass up the flue A', over the end of the wall B, beneath the valve, down the flues $A^3$, around the lower end of the other wall B, and thence up the flue $A^2$. The walls B and the pivot for the rocker-bar F are so constructed as to prevent any communication between the flues A' and $A^2$ except by way of the flues $A^3$, and the rings C fit so closely within the pipe that the air cannot pass them, thus making it certain that all will go through the tortuous passage. Without the use of the rings C it would be necessary to leave quite a large space between the pipe and the edge of the valve to allow for irregularities in the former, as the valve could not be operated if it came in contact with the pipe, and the rings furnish a seat for the valve and prevent the pipe from being indented. In this construction the valves are perfectly balanced, making them easy to operate and causing them to remain at any angle to which they may be turned without any other means of holding them. The device is also, because of its peculiar construction, very quickly and easily inserted in the pipe and requires no skill or special tools. The damper is first forced into the end of the pipe, then a small hole made in the pipe for the insertion of the rod I, which rod is passed through the opening in the rocker-bar F until its sharpened end contacts the opposite side of the pipe. A slight blow on the rod will then mark the exact place where the opposite hole is to be made, as the rings C hold the device in line with the pipe. It is intended that no fastening other than the rod I is required to hold the device in place, as the rings fit tightly in the pipe.

This damper may be used in the horizontal position of the pipe as well as in the vertical, and when such portion is near the ceiling longer pulls $J^2$ may be used. The device may also be used in a heating-drum.

What I claim as my invention is—

1. In a damper, in combination, two semicircular partition-walls adapted to divide the space within a pipe into flues and having their convex sides secured together with one wall extended upward a greater distance and downward a lesser distance than the other, and valves pivoted to the projecting ends of said walls.

2. In a damper, the combination with partition-walls adapted to divide the space within a pipe into flues, one wall extending upward a greater distance than the other and downward a lesser distance, of rings adapted to fit closely within the pipe and each secured at one side to the projecting end of one of said walls and extended laterally at a distance from the adjacent end of the other wall, valves pivotally mounted upon said rings and adapted to close the openings in said rings.

3. In a damper, the combination with semicircular walls adapted to divide the space within a pipe into flues, of crescentic rings each having its concave side secured to the end of one of said walls with its convex side adapted to engage the pipe, bearings on said rings, an inwardly-projecting flange on each of said rings, crescentic valves adapted to engage said flanges and close the openings in said rings, and trunnions on said valves to engage said bearings.

4. In a damper, the combination with partition-walls adapted to divide the space within a pipe into flues, of valves pivoted to the opposite ends of said walls to close said flues and extending toward opposite sides of the pipe, a rocker-bar pivoted on said walls intermediate their ends, rods connecting the ends of said rocker-bar with said valves, and means for operating the rocker-bar.

5. In a damper, the combination with two semicircular partition-walls adapted to divide the space within a pipe into flues and having their convex sides secured together and provided with openings at their meeting-point intermediate their ends, of a rocker-bar pivoted in said openings, an operating-rod extended through the axis of the pivot of said bar, crescentic rings secured to the ends of said walls, crescentic valves pivotally mounted on said rings with their convexed sides extending toward opposite sides of the pipe, arms extending laterally from the concaved sides of said valves, and rods connecting said arms with the ends of the rocker-bar.

6. In a damper, the combination with two semicircular partition-walls having their convex sides secured together and provided with openings at their meeting-point intermediate their ends, of a rocker-bar having a protuberance intermediate its ends, a socket for said protuberance secured in said openings, a transverse operating-rod in the axis of the protuberance, valves pivoted to the ends of said walls, arms on said valves, and rods connecting said arms and the ends of said rocker-bar.

7. In a damper, the combination with two semicircular partition-walls having their convex sides secured together and provided with openings at their meeting-point intermediate their ends, of an operating-rod having a transverse pin, a rocker-bar having a hemispherical protuberance having an axial opening to receive the operating-rod, an axial slot to allow the pin to pass and a notch at right angles to said slot to receive said pin, a socket consisting of halves to embrace said protuberance and provided with slots for the rocker-bar, valves pivoted to the ends of the walls, arms on said valves, and rods connecting said arms and the ends of the rocker-bar.

8. In a damper, in combination with the pipe or casing in which it is inserted, two semicircular partition-walls having their convex sides secured together and provided with openings at their meeting-point intermediate their ends, of an operating-rod extending through the walls of the pipe and provided at one end with a head having a groove and intermediate its ends with a transverse pin, a handle on said rod having a rib to engage said groove, a spring sleeved on said rod between the pipe and said handle, a rocker-bar having a hemispherical protuberance, having an axial opening to receive the operating-rod and an axial slot to allow the pin to pass and a notch in which the pin is held by the spring, a socket consisting of halves to embrace said protuberance and provided with slots for the rocker-bar, flanges on the halves of said socket engaging the walls to hold the halves together, crescentic rings secured to the ends of the walls, valves pivoted to said rings, and rods connecting said valves with the ends of said rocker-bar.

In testimony whereof I affix my signature in presence of two witnesses.

CHARLES C. McCURLEY.

Witnesses:
WILLIAM F. BERNESKE,
OTTO F. BARTHEL.